(12) United States Patent
Smith et al.

(10) Patent No.: US 9,387,538 B2
(45) Date of Patent: Jul. 12, 2016

(54) TOOL HOLDER FOR MACHINE TOOL, MACHINE TOOL ASSEMBLY, AND METHODS

(71) Applicant: NTM, Inc., Minneapolis, MN (US)

(72) Inventors: Jeff Smith, Cedar, MN (US); Greg Buck, Edina, MN (US); Christopher Bryan Billingsley, Lake Elmo, MN (US)

(73) Assignee: NTM, Inc., Minneapolis, MN (US)

( * ) Notice: Subject to any disclaimer, the term of this patent is extended or adjusted under 35 U.S.C. 154(b) by 182 days.

(21) Appl. No.: 14/291,348

(22) Filed: May 30, 2014

(65) Prior Publication Data
US 2014/0356082 A1    Dec. 4, 2014

Related U.S. Application Data

(60) Provisional application No. 61/829,382, filed on May 31, 2013.

(51) Int. Cl.
*B23B 27/10*    (2006.01)
*B23Q 11/10*    (2006.01)

(52) U.S. Cl.
CPC ........... *B23B 27/10* (2013.01); *Y10T 29/49826* (2015.01); *Y10T 407/14* (2015.01)

(58) Field of Classification Search
CPC ...... B23B 27/10; B23B 2250/12; B23C 5/28; B23Q 11/10; B23Q 11/1015; B23Q 11/1023
See application file for complete search history.

(56) References Cited

U.S. PATENT DOCUMENTS

| 1,030,387 | A | | 6/1912 | Critton | |
|---|---|---|---|---|---|
| 2,851,764 | A | * | 9/1958 | White | B23Q 11/10 29/DIG. 88 |
| 3,176,330 | A | * | 4/1965 | Jennings | B23B 27/10 29/DIG. 66 |
| 3,364,800 | A | | 1/1968 | Benjamin et al. | |
| 3,597,817 | A | | 8/1971 | Whalley | |
| 3,609,931 | A | | 10/1971 | Voorhies | |
| 3,726,363 | A | * | 4/1973 | Sussman | B23Q 11/103 184/39.1 |
| 4,705,435 | A | | 11/1987 | Christoffel | |
| 5,190,421 | A | * | 3/1993 | Wen | B23Q 11/10 184/6.14 |
| 5,265,505 | A | * | 11/1993 | Frechette | B23Q 1/0018 29/39 |
| 5,382,121 | A | | 1/1995 | Bicknell | |
| 6,299,388 | B1 | * | 10/2001 | Slabe | B23B 27/10 407/100 |
| 6,302,004 | B1 | * | 10/2001 | Taylor | B23B 27/10 407/5 |
| 7,866,641 | B1 | | 1/2011 | Switzer | |
| 8,066,457 | B2 | | 11/2011 | Buettiker et al. | |
| 8,074,542 | B2 | * | 12/2011 | Zwara | B23B 29/24 82/50 |
| 2002/0127067 | A1 | * | 9/2002 | Lagerberg | B23B 29/046 407/11 |
| 2008/0206004 | A1 | * | 8/2008 | Giannetti | B23Q 11/10 408/56 |
| 2011/0318123 | A1 | * | 12/2011 | Leishman | B23Q 11/10 408/1 R |

FOREIGN PATENT DOCUMENTS

EP    0 791 420    8/1997

* cited by examiner

*Primary Examiner* — Will Fridie, Jr.
(74) *Attorney, Agent, or Firm* — Merchant & Gould P.C.

(57) ABSTRACT

A tool holder and method for a machine tool includes a rear facing fluid port that will flush the next tool loaded in a gang style tool block while also allowing the fluid, such as coolant, to flow to the tool that is engaged with the workpiece.

18 Claims, 6 Drawing Sheets

TOOL HOLDER FOR MACHINE TOOL, MACHINE TOOL ASSEMBLY, AND METHODS

CROSS REFERENCE TO RELATED APPLICATION

This application claims the benefit of U.S. Provisional Patent Application No. 61/829,382, filed May 31, 2013, which application is hereby incorporated by reference in their entirety.

TECHNICAL FIELD

This disclosure is directed to metal working operations, and, in particular, to a tool holder for a machine tool for metal working This disclosure also is directed to a machine tool assembly, methods of assembling a tool holder, and methods of use.

BACKGROUND

During many metal working operations, it is desirable to flush the interface between a cutting tool and the workpiece with fluid, e.g. a coolant, to avoid damage to the cutting tool and to the workpiece as a result of high temperatures generated at this interface and to clear chips that may become tangled at this interface.

If multiple tool holders are used, for example, in the context of a gang style tool block, it can become expensive to provide coolant for each of the tool holders. Improvements are desirable.

SUMMARY

A tool holder for a machine tool is provided, in which the tool holder will have a rear facing fluid port that will flush the next tool loaded in a gang style tool block while also allowing the fluid, such as coolant, to flow to the tool that is engaged with the workpiece.

In general, a tool holder is provided having a shank body with a front end, a rear end, and a top surface. The tool holder has a tool head extending rearwardly from the front end of the shank body. The tool head defines a pocket downwardly from the top surface of the shank body and rearwardly from the front end of the shank body. The pocket includes an insert-receiving compartment adapted to receive a cutting tool insert and to position a cutting tip of the insert beyond the front end of the shank body. The pocket includes a wall adjacent to the compartment. The shank body defines a fluid passageway extending through the shank body into the tool head and terminating in at least a first discharge port and a second discharge port. The first discharge port is in the pocket wall to discharge fluid adjacent to the insert-receiving compartment. The second discharge port is in the tool head on an opposite side of the shank body from the insert-receiving compartment to discharge fluid from the opposite side.

In general, a machine tool assembly is provided including a gang tool including a block partitioned with at least first and second receivers, each first and second receiver constructed and arranged to receive a tool holder. The tool holder is operably mounted in the first receiver of the block. The tool holder includes a shank body having a front end, a rear end, and a top surface. A tool head extends rearwardly from the front end of the shank body. The tool head defines a pocket downwardly from the top surface of the shank body and rearwardly from the front end of the shank body. The pocket includes an insert-receiving compartment adapted to receive a cutting tool insert and to position a cutting tip of the insert beyond the front end of the shank body. The pocket includes a wall adjacent to the compartment. The shank body defines a fluid passageway extending through the shank body into the tool head and terminating in at least a first discharge port and a second discharge port. The first discharge port is oriented to discharge fluid adjacent to the insert-receiving compartment. The second discharge port is oriented to discharge fluid in a direction toward the second receiver.

A method of assembling a tool holder is provided. The method includes providing a shank body having a tool head. The tool head defines a pocket including an insert-receiving compartment. The shank body has a fluid passageway extending through the shank body into the tool head and terminating in at least a first discharge port and a second discharge port. The method also includes operably mounting a cutting tool insert in the insert-receiving compartment to position the insert adjacent to the first discharge port, and so that the second discharge port is on an opposite side of the shank body from the insert.

The method may also include providing a gang tool including a block partitioned with at least first and second receivers, each of the first and second receivers constructed and arranged to receive a tool holder. The method can include operably mounting the tool holder in the first receiver of the block so that the second discharge port is oriented to discharge fluid in a direction toward the second receiver.

A method of using a machine tool is provided including positioning a block of a gang tool having at least first and second tool holders therein so that a cutting tool insert positioned in the first tool holder is in engagement with a workpiece. The first tool holder will include a shank body having a tool head. The tool head defines a pocket including an insert-receiving compartment with the cutting tool insert positioned therein. The shank body has a fluid passageway extending through the shank body into the tool head and terminating in at least a first discharge port and a second discharge port. The method includes discharging fluid through the first discharge port in a direction toward the cutting tool insert. The method also includes discharging fluid through the second discharge port in a direction toward the second tool holder.

A variety of examples of desirable product features or methods are set forth in part in the description that follows, and in part will be apparent from the description, or may be learned by practicing various aspect of this disclosure. The aspects of the disclosure may relate to individual features as well as combinations of features. It is to be understood that both the forgoing general description and the following detailed description are explanatory only, and are not restrictive of the claimed invention.

DETAILED DESCRIPTION

Figure 1:
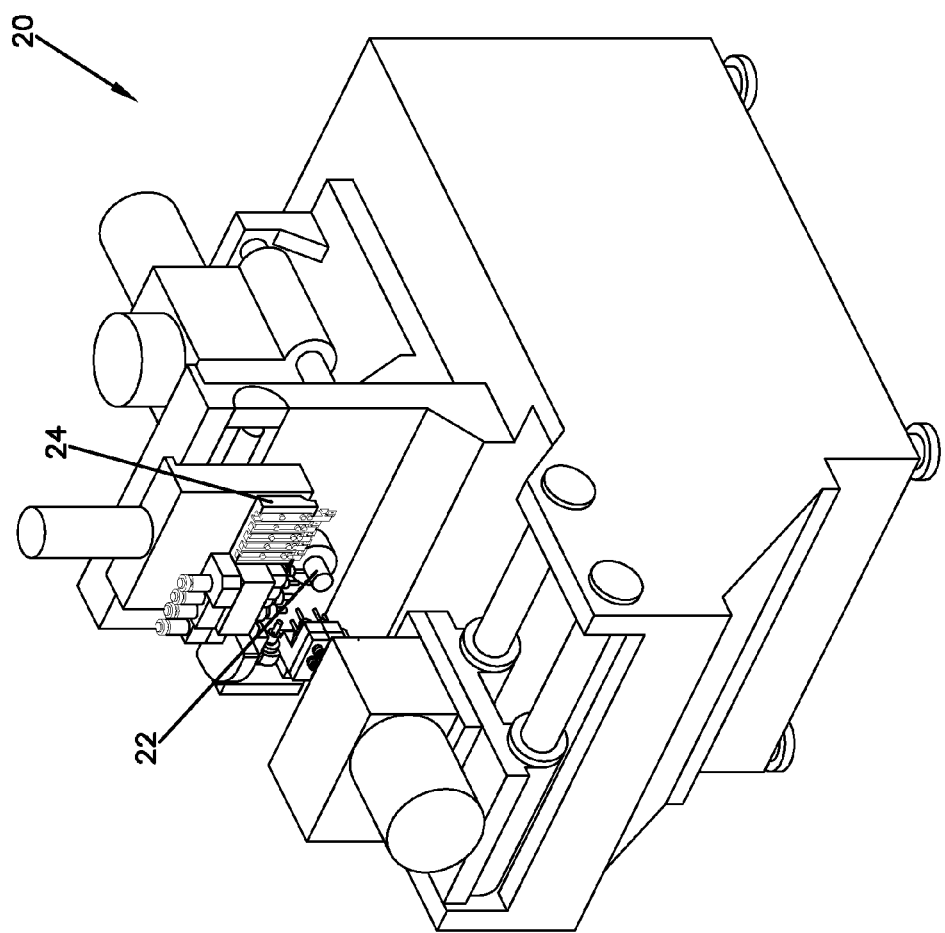
FIG. 1 is a schematic, perspective view of one example machine utilizing principles of this disclosure.

FIG. 1 illustrates a schematic, perspective view of one type of machine that can use a tool holder constructed in accordance with principles of this disclosure. FIG. 1 is a Swiss-type CNC machine tool assembly 20. The CNC machine tool assembly 20 has a spindle 22 for holding and rotating a workpiece indexed against a stationary tool holder block 24, which is also part of the assembly 20. The tool holder block 24 can move into engagement with the workpiece for performing tooling operations.

Figure 2:
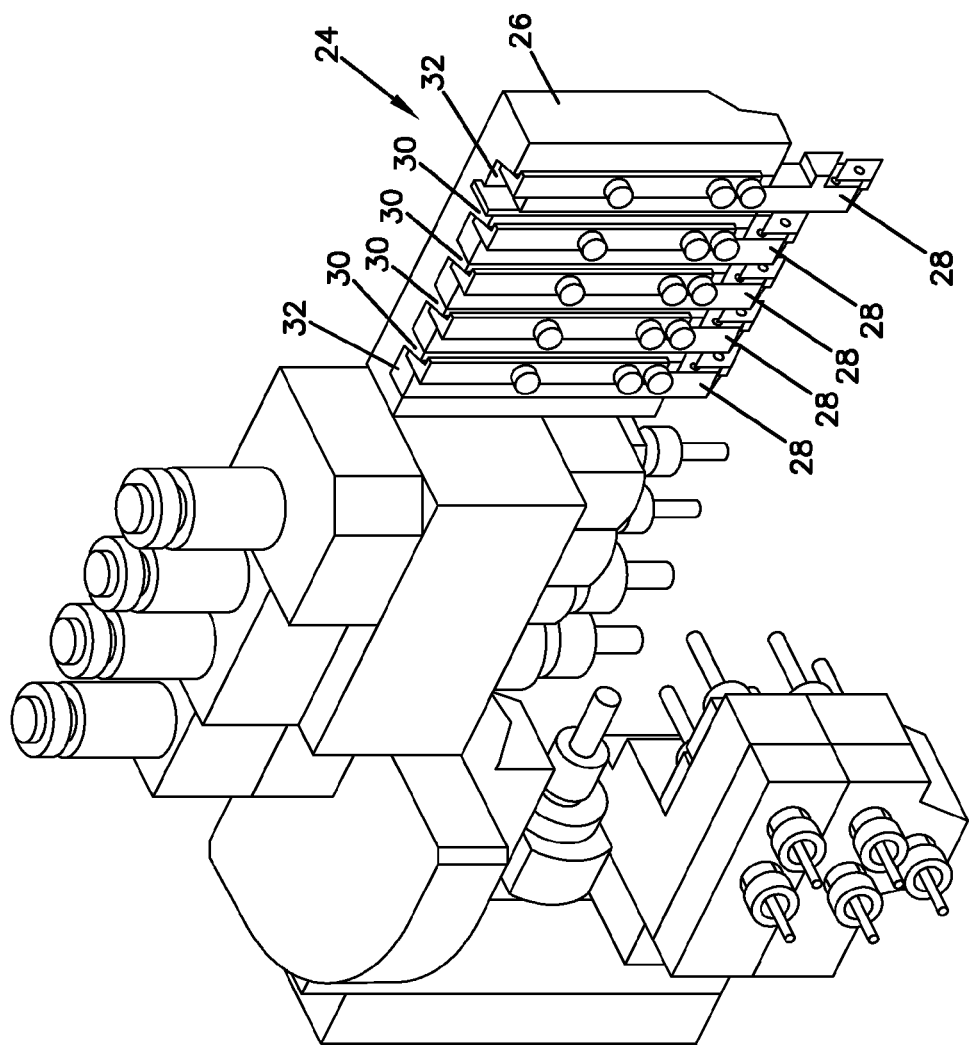
FIG. 2 is a schematic, perspective view of a portion of the machine of FIG. 1, utilizing principles of this disclosure.

In FIG. 2, an enlarged view of the tool holder block 24 is illustrated. In the example of FIG. 2, the tool holder block 24 is a gang style holder 26. The block 24 can removably hold a plurality of tool holders 28. In the example shown in FIG. 2, the block 24 is shown holding five tool holders 28.

Figure 3:
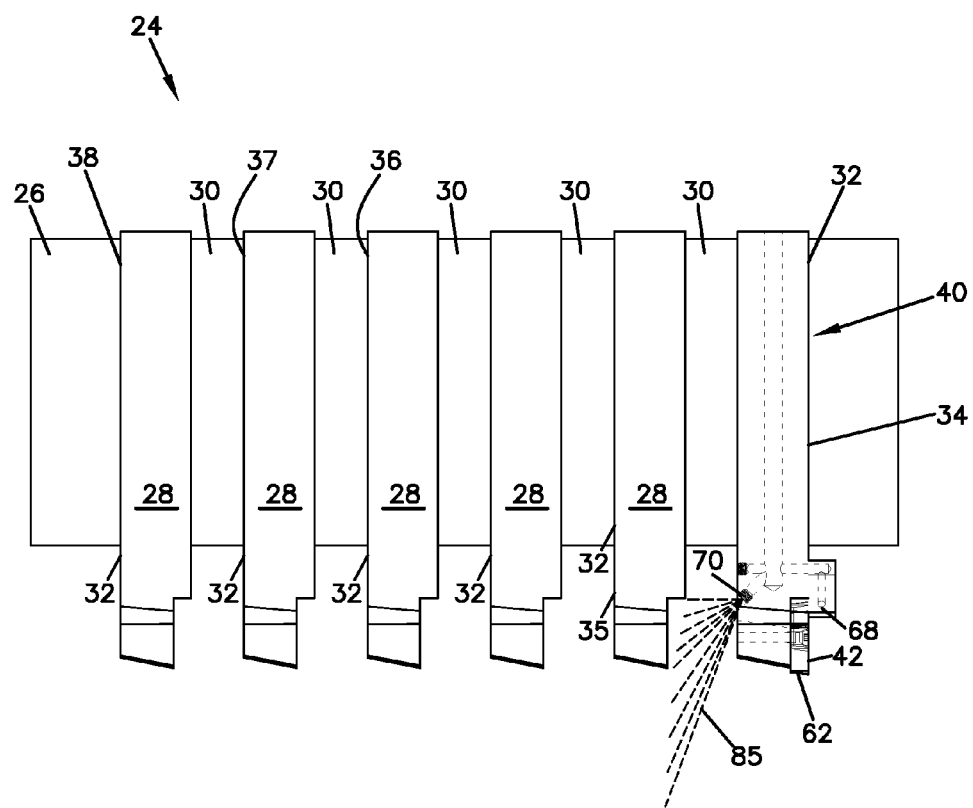
FIG. 3 is a schematic, front view of a tool block having a tool holder constructed in accordance with principles of this disclosure.

FIG. 3 shows a front view of the gang style holder 26. The block 24 includes a plurality of partitions 30 dividing the block 24 between individual tool holder receivers 32. In FIG. 3, the receivers 32 are in the block 24 underneath the tool holders 28. The block 24 includes at least a first receiver 34 and a second receiver 35. In the example of FIG. 3, the block 24 includes a third receiver 36, a fourth receiver 37, and a fifth receiver 38. Tool holders 28 can be operably mounted in each of the receivers 32.

Figure 4:
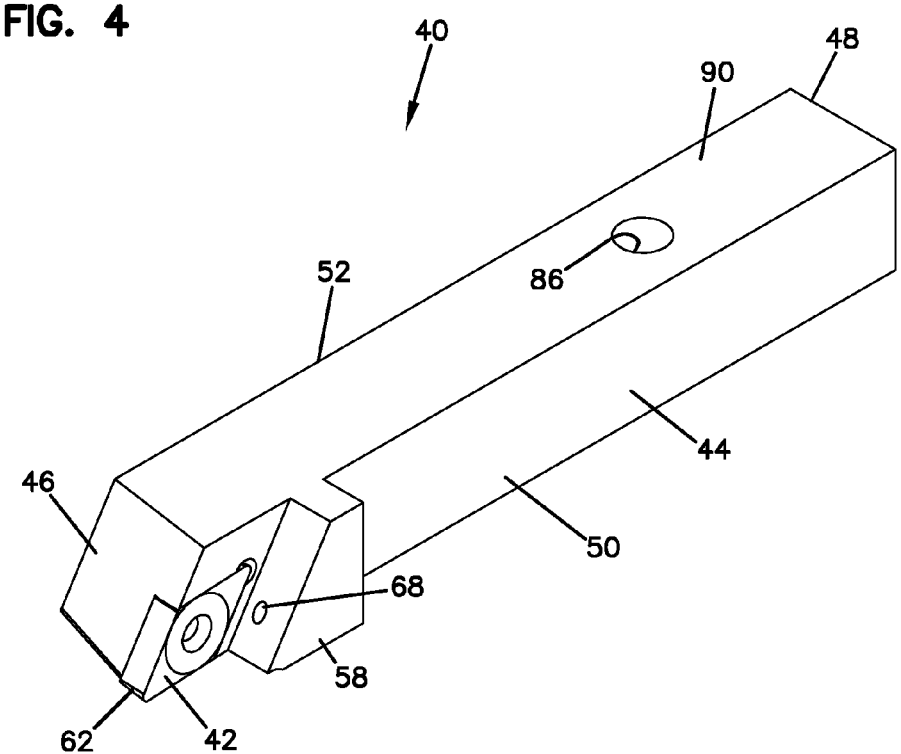
FIG. 4 is a perspective view of a tool holder having a cutting tool insert, the tool holder being constructed in accordance with principles of this disclosure.
Figure 5:
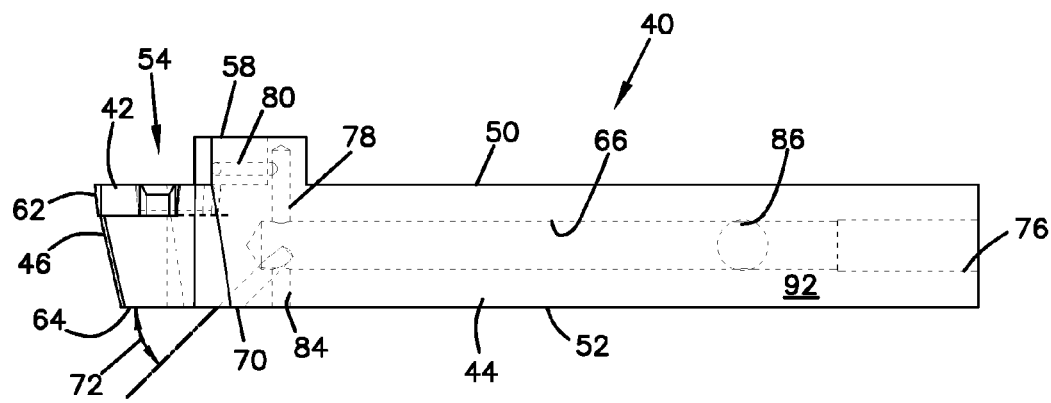
FIG. 5 is a side view of the tool holder with cutting tool insert depicted in FIG. 4, constructed in accordance with principles of this disclosure.
Figure 6:
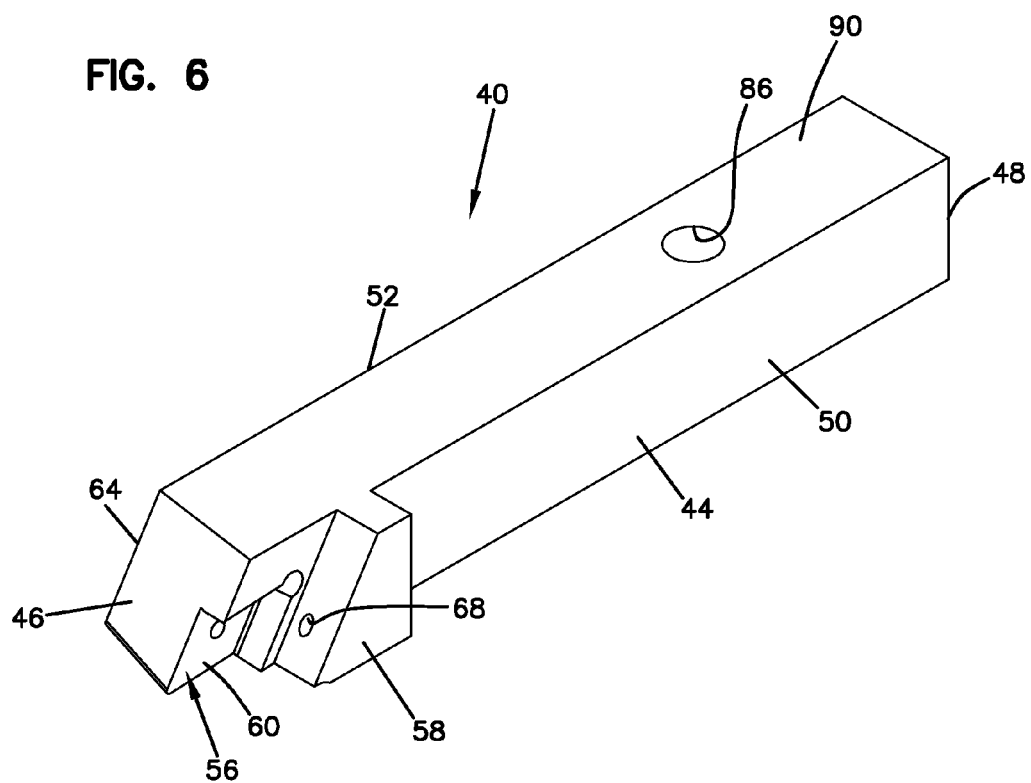
FIG. 6 is a perspective view of the tool holder of FIGS. 4 and 5, without the cutting tool insert assembled therein, constructed in accordance with principles of this disclosure.
Figure 10:
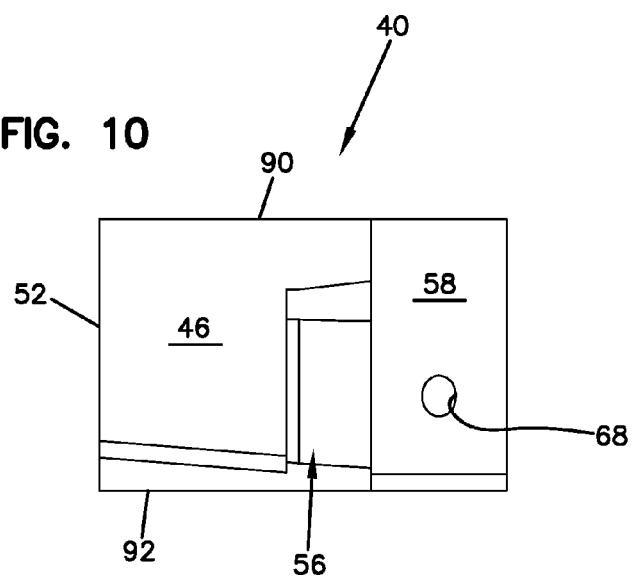
FIG. 10 is an end view of the tool holder of FIG. 6.
Figure 7:
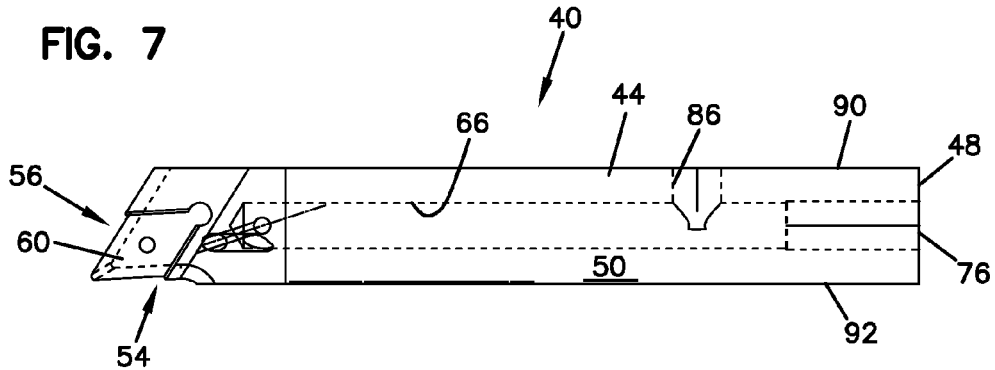
FIG. 7 is a front view of the tool holder of FIG. 6.

Turning now to FIGS. 4 and 5, one tool holder 28 that can be used in the block 24 is a tool holder 40, constructed in accordance with principles of this disclosure. In preferred implementations, the tool holder 40 is constructed to discharge fluid, for example, coolant, in at least two distinct directions. One direction will include in a direction toward the next adjacent tool holder 28 in the block 24.

FIGS. 4 and 5 show the tool holder 40 with a removable and replaceable cutting tool insert 42 operably held thereby. FIGS. 6-10 show the tool holder 40 before the cutting tool insert 42 has been mounted thereto.

In reference now to FIGS. 4-10, the tool holder 40 includes a shank body 44. The shank body 44, in the illustrated example, has a rectangular (e.g., square) cross-section, which can then be easily mounted within the tool holder block 24. Of course, other shaped cross-sections are possible for the shank body 44.

The shank body 44 has a front end 46, a rear end 48, and a top surface 50. Opposite the top surface 50 is a bottom surface 52.

A tool head 54 extends rearwardly from the front end 46 of the shank body 44. Tool head 54 can be an integral part of the shank body 44. In alternate embodiments, the tool head 54 can be a separate piece and removably attached to the rest of the shank body 44.

The tool head 54 defines a pocket 56. The pocket 56 extends into the tool head 54 downwardly from the top surface 50 of the shank body 44 and rearwardly from the front end 46 of the shank body 44.

In the example shown, the pocket 56 has a wall 58. The wall 58 can be extending from the top surface 50 of the shank body 44.

At least a portion of the pocket 56 includes an insert-receiving compartment 60 adapted to receive the cutting tool insert 42 (FIGS. 4 and 5). When the insert 42 is operably positioned within the insert receiving compartment 60, a cutting tip 62 (FIGS. 4 and 5) of the insert 42 is positioned beyond the front end 46 of the shank body 44, such that the tip 62 can engage a workpiece in the CNC machine 20.

As mentioned previously, the tool holder 40 is constructed and arranged to discharge fluid in at least two distinct directions. In one direction, the fluid (such as coolant) is discharged adjacent to the insert-receiving compartment 60. In a second direction, the fluid (such as coolant) is discharged in a direction toward the next adjacent tool holder 28 in the block 24. In the example shown, this second discharge direction is from the bottom surface 52, which is on the opposite side 64 of the shank body 44 from the insert-receiving compartment 60.

Figure 8:
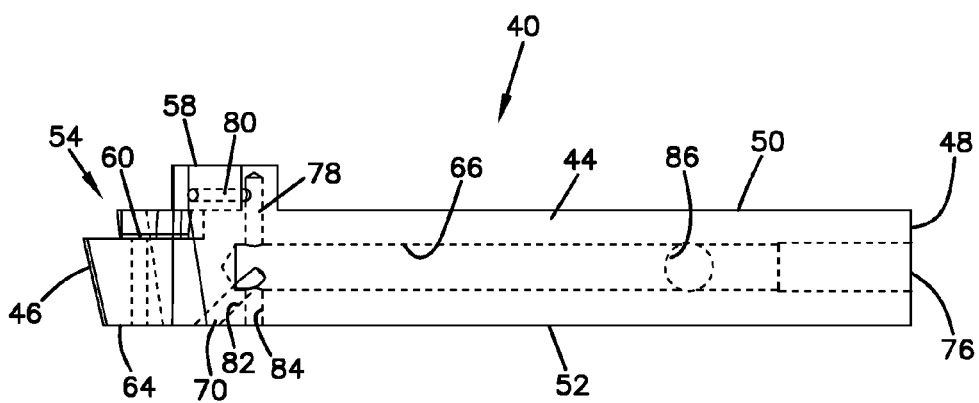
FIG. 8 is a bottom view of the tool holder of FIG. 6.
Figure 9:
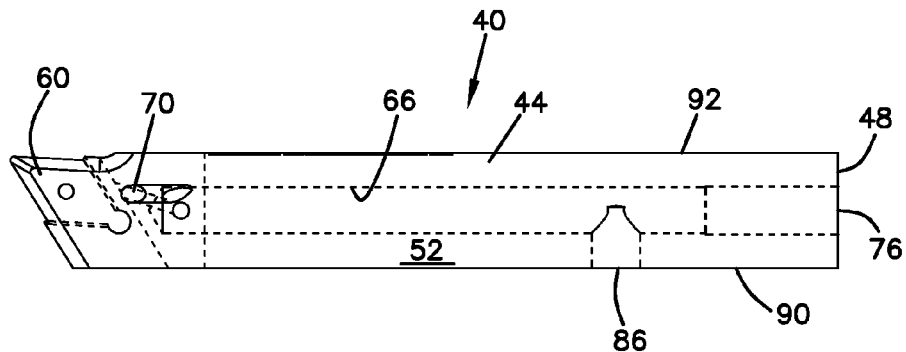
FIG. 9 is a rear view of the tool holder of FIG. 6.

Many embodiments are possible for accomplishing the result of having fluid discharged in two distinct directions. In the example illustrated, the shank body 44 defines a fluid passageway 66 extending through the shank body 44 into the tool head 54 and terminating in at least a first discharge port 68 (FIGS. 6 and 10) and a second discharge port 70 (FIGS. 5 and 8). The fluid passageway 66 can be for providing flow of coolant, such as cutting oil, for example.

In the example shown, the first discharge port 68 is in the pocket wall 58. The first discharge port 68 is oriented to discharge fluid adjacent to the insert-receiving compartment 60. In operation, the fluid discharged from the first discharge port 68 will typically flow over the insert 42 and at the region of engagement between the insert 42 and the workpiece.

In the examples shown, the second discharge port 70 is in the tool head 54 on the opposite side 64 of the shank body 44 from the insert-receiving compartment 60 to discharge fluid from the opposite side 64.

The second discharge port 70 can include many implementations. In the example shown, the second discharge port 70 is angled at a non-orthogonal angle within the tool head 54 to discharge fluid at an acute angle 72 (FIG. 5) relative to the opposite side 64 of the shank body 44. A range of angles are usable. One suitable range of angles 72 includes 30-60°, and in the example shown, the angle 72 is about 45°.

In examples where the first discharge port 68 is arranged to discharge fluid about parallel to the top surface 74 of the insert 42, and also about parallel to the insert-receiving compartment 60 of the pocket 56, the discharge ports 68, 70 will be angled to discharge fluid, such as coolant, in a range of about 30-60°, for example, about 45° relative to each other.

Many different embodiments are possible. In the one illustrated, the fluid passageway 66 begins at a fluid supply port 76. In the particular example illustrated, the fluid supply port 76 is located in the rear end 48 of the shank body 44. The fluid supply port 76 can be from alternate locations, other than from the rear end 48 as shown. An alternate supply port is shown at 86, for example. Supply port 86 extends through the side surface 90, which is the surface between the top surface 50 and bottom surface 52. If the fluid supply port 76 through the rear end 48 is used, then the supply port 86 will be plugged. Alternatively, if supply port 86 is used, then other supply ports will be plugged.

The fluid passageway 66 extends through the shank body 44 and into the tool head 54. Branching off of the fluid passageway 66 and in fluid communication with the fluid passageway 66 is a first port passageway 78. In the example shown, the first port passageway 78 is generally orthogonal to the fluid passageway 66.

As can be seen in FIGS. 5 and 8, extending from the first port passageway 78 is a pocket wall passageway 80. The pocket wall passageway 80, in the example shown, extends through the pocket wall 58 and ultimately terminates in the first discharge port 68. This example shows the pocket wall passageway 80 as being generally orthogonal to the first port passageway 78.

From the above, it should be understood that fluid enters the fluid supply port 76 (or alternate port 86), flows through the fluid passageway 66, then flows through the first port passageway 78, then flows through the pocket wall passageway 80, and then is discharged through the first discharge port 68.

Still in reference to FIGS. 5 and 8, branching off from the fluid passageway 66 is a second port passageway 82. The second port passageway 82 terminates in the second discharge port 70. Many embodiments are possible, and in this embodiment, the second port passageway 82 is shown angled relative to the fluid passageway 66. The angle can vary between about 30-60°, and in this example, the angle is about 45°.

From the above, it should be understood that fluid enters the fluid supply port 76 (or alternate port 86) and flows through the fluid passageway 66. From there, it branches off into the second port passageway 82 and is discharged from the second discharge port 70. As explained above, some of the fluid also branches off through the first discharge port passageway 78, then flows through the pocket wall passageway 80, and then is discharged through the first discharge port 68.

Still in reference to FIGS. 5 and 8, the shank body 44 includes a bore 84 extending from the bottom surface 52 and into communication with the fluid passageway 66. This bore 84 is made in order to form the first port passageway 78. After the first port passageway 78 is formed, the bore 84 extending from the bottom surface 52 is plugged.

Attention is again directed to FIG. 3. In FIG. 3, the tool holder 40 is shown in the first receiver 34, while a second tool holder 28 is shown in the second receiver 35. The tool holder 40 is oriented within the block 24 and relative to the other tool holders 28 so that the first discharge port 68 discharges fluid adjacent to the insert-receiving compartment 60. The second discharge port 70 is oriented to discharge fluid 85 in a direction toward the second receiver 35. In many implementations, the first discharge port 68 and the second discharge port 70 can discharge coolant. The first discharge port 68 can, for example, discharge the coolant in a direction downwardly, which would be to flow over the cutting tool insert 42 and at the region of engagement between the insert 42 and the workpiece. The second discharge port 70 can discharge coolant in a direction lateral to the tool holder 40 in the first receiver 34, so that the coolant would be sprayed in a direction toward the second receiver 35.

When the fluid is discharged toward the tool holder 28 in the second receiver 35, this will help to remove any chips that may cling onto or clutter the tool holder 28 in the second receiver 35.

One advantage of this arrangement, in addition to removing chips from the tool holder 28 in the second receiver 35, is that the tool holder 28 that is adjacent to the tool holder 40 can be one that does not include fluid passageways for coolant, for example. Thus, the tool holder 28 that is adjacent to the tool holder 40 can be a more economical, less expensive tool holder 28 that does not include fluid passageways.

A suitable fitting can be used to removably attach to the shank body 44 to provide fluid, such as coolant, through the fluid supply port 76 (or alternate port 86).

A method of assembling tool holder 40 can include providing shank body 44 having tool head 54. The tool head 54 will define pocket 56 including insert-receiving compartment 60. The shank body 44 will have fluid passageway 66 extending through the shank body 44 into the tool head 54 and terminating in at least first discharge port 68 and second discharge port 70. The method can include operably mounting cutting tool insert 42 into the insert-receiving compartment 60 to position the insert 42 adjacent to the first discharge port 68 and so that the second discharge port 70 is on opposite side 64 of the shank body 44 from the insert 42.

The method can include providing gang style tool holder 26 having block 24 partitioned with at least the first and second receivers 34, 35. The method can include operably mounting the tool holder 40 in the first receiver 34 of the block 24 so that the second discharge port 70 is oriented to discharge fluid, such as coolant, in a direction toward the second receiver 35.

The method of using a machine tool can be applied. The method can include positioning the block 24 having at least a first tool holder 40 and second tool holder 28 therein so that cutting tool insert 42 positioned in the first tool holder 40 is in engagement with the workpiece. The method includes discharging fluid through the first discharge port 68 in a direction toward the cutting tool insert 42, and discharging fluid through the second discharge port 70 in a direction toward the second tool holder 28.

In preferred implementations, the fluid discharged through the ports 68, 70 are coolant. For example, the coolant can be cutting oil.

In operation, the tool 40 can be used in many different ways. For example, the tool 40 can engage the raw piece of bar stock, face it, and then do the O.D. (outer diameter) turn, by taking off the outer diameter of the bar stock. While this operation is going on, fluid, such as coolant, is being discharged through the first discharge port 68 at the engagement between the insert 42 and the bar stock, while fluid, such as coolant, is also being discharged through the second discharge port 70 at the next adjacent tool holder 28. The fluid discharged through the second discharge port 70 is helpful to knock away chips from the next adjacent tool holder 28. As mentioned above, this can also mean that the tool holder 28 in the second receiver 35, adjacent to the tool holder 40, can be a tool holder that does not have passageways for coolant, and can thus be a shank body that is free of coolant passageways.

The tool holder 40 can be many different sizes. In one useful example, the tool holder 40 has an overall length of about 3.9-4 inches. The thickness between the side surfaces 90, 92 can be about 0.5 inches. The thickness between the top surface 50 and bottom surface 52 can be about 0.5 inches. The pocket wall 58 can extend above the top surface 50 a length of about 0.25 inches. The tool holder 40 will be made from metal, such as steel, for example 4140 PH steel.

The above description includes example principles. Many embodiments can be made using these principles.

What is claimed is:

1. A tool holder for a machine tool; the tool holder comprising:
   (a) a shank body having a front end, a rear end, and a top surface;
   (b) a tool head extending rearwardly from the front end of the shank body;

(i) the tool head defining a pocket downwardly from the top surface of the shank body and rearwardly from the front end of the shank body;
    (A) the pocket including an insert-receiving compartment adapted to receive a cutting tool insert and to position a cutting tip of the insert beyond the front end of the shank body;
    (B) the pocket including a wall adjacent to the compartment; and
(c) wherein the shank body defines a fluid passageway extending through the shank body into the tool head and terminating in at least a first discharge port and a second discharge port;
    (i) the first discharge port being in the pocket wall to discharge fluid adjacent to the insert-receiving compartment; and
    (ii) the second discharge port being in the tool head on an opposite side of the shank body from the insert-receiving compartment to discharge fluid from said opposite side.

2. A tool holder according to claim 1 wherein:
(a) the pocket wall extends from the top surface of the shank body; and the first discharge port is positioned to discharge fluid over the cutting tool insert, when the cutting tool insert is operably positioned in the insert-receiving compartment.

3. A tool holder according to claim 1 wherein:
(a) the second discharge port is angled at a non-orthogonal angle within the tool head to discharge fluid at an acute angle relative to said opposite side of the shank body.

4. A tool holder according to claim 1 wherein:
(a) the tool head is an integral part of the shank body.

5. A tool holder according to claim 1 wherein:
(a) the fluid passageway begins at a fluid supply port in the rear end of the shank body.

6. A tool holder according to claim 1 further comprising:
(a) a cutting tool insert operably mounted within the insert-receiving compartment.

7. A machine tool assembly comprising:
(a) a gang tool including a block partitioned with at least first and second receivers, each first and second receiver constructed and arranged to receive a tool holder; and
(b) a tool holder operably mounted in the first receiver of the block, the tool holder including:
    (i) a shank body having a front end, a rear end, and a top surface;
    (ii) a tool head extending rearwardly from the front end of the shank body;
        (A) the tool head defining a pocket downwardly from the top surface of the shank body and rearwardly from the front end of the shank body;
            (1) the pocket including an insert-receiving compartment adapted to receive a cutting tool insert and to position a cutting tip of the insert beyond the front end of the shank body;
            (2) the pocket including a wall adjacent to the compartment; and
    (iii) wherein the shank body defines a fluid passageway extending through the shank body into the tool head and terminating in at least a first discharge port and a second discharge port;
        (A) the first discharge port being oriented to discharge fluid adjacent to the insert-receiving compartment; and
        (B) the second discharge port being oriented to discharge fluid in a direction toward the second receiver.

8. A machine tool assembly according to claim 7 wherein:
(a) the first discharge port is in the pocket wall; and
(b) the second discharge port is in the tool head on an opposite side of the shank body from the insert-receiving compartment to discharge fluid from said opposite side.

9. A machine tool assembly according to claim 7 further comprising:
(a) a second tool holder operably mounted in the second receiver.

10. A machine tool assembly according to claim 9 wherein:
(a) the second tool holder includes a second tool holder shank body that is free of fluid passageways.

11. A machine tool assembly according to claim 7 wherein:
(a) the pocket wall extends from the top surface of the shank body; and the first discharge port is positioned to discharge fluid over the cutting tool insert, when the cutting tool insert is operably positioned in the insert-receiving compartment.

12. A machine tool assembly according to claim 7 wherein:
(a) the second discharge port is angled at a non-orthogonal angle within the tool head to discharge fluid at an acute angle relative to said opposite side of the shank body.

13. A machine tool assembly according to claim 7 further comprising:
(a) a cutting tool insert operably mounted within the insert-receiving compartment.

14. A method of assembling a tool holder, the method comprising:
(a) providing a shank body having a tool head; the tool head defining a pocket including an insert-receiving compartment; the shank body having a fluid passageway extending through the shank body into the tool head and terminating in at least a first discharge port and a second discharge port; and
(b) operably mounting a cutting tool insert in the insert-receiving compartment to position the insert adjacent to the first discharge port, and so that the second discharge port is on opposite side of the shank body from the insert;
(c) providing a gang tool including a block partitioned with at least first and second receivers, each of the first and second receivers constructed and arranged to receive a tool holder; and (d) operably mounting the tool holder in the first receiver of the block so that the second discharged port is oriented to discharge fluid in a direction toward the second receiver.

15. A method according to claim 14 wherein:
(a) the step of providing a shank body includes providing a shank body having a front end, a rear end, and a top surface; the tool head extending rearwardly from the front end of the shank body; and the pocket being defined downwardly from the top surface of the shank body and rearwardly from the front end of the shank body.

16. A method of using a machine tool, the method comprising:
(a) positioning a block of a gang tool having at least first and second tool holders therein so that a cutting tool insert positioned in the first tool holder is in engagement with a workpiece;
    (i) the first tool holder including a shank body having a tool head; the tool head defining a pocket including an insert-receiving compartment with the cutting tool insert positioned therein; the shank body having a fluid passageway extending through the shank body into the tool head and terminating in at least a first discharge port and a second discharge port;

(b) discharging fluid through the first discharge port in a direction toward the cutting tool insert; and
(c) discharging fluid through the second discharge port in a direction toward the second tool holder.

17. A method according to claim 16 wherein:
(a) the step of positioning a block includes using the first tool holder having the first discharge port in the pocket wall; and the second discharge port in the tool head on an opposite side of the shank body from the insert-receiving compartment.

18. A method according to claim 16 wherein:
(a) the step of discharging fluid through the first discharge port includes discharging coolant; and
(b) the step of discharging fluid through the second discharge port includes discharging coolant.

* * * * *